Figure 1:
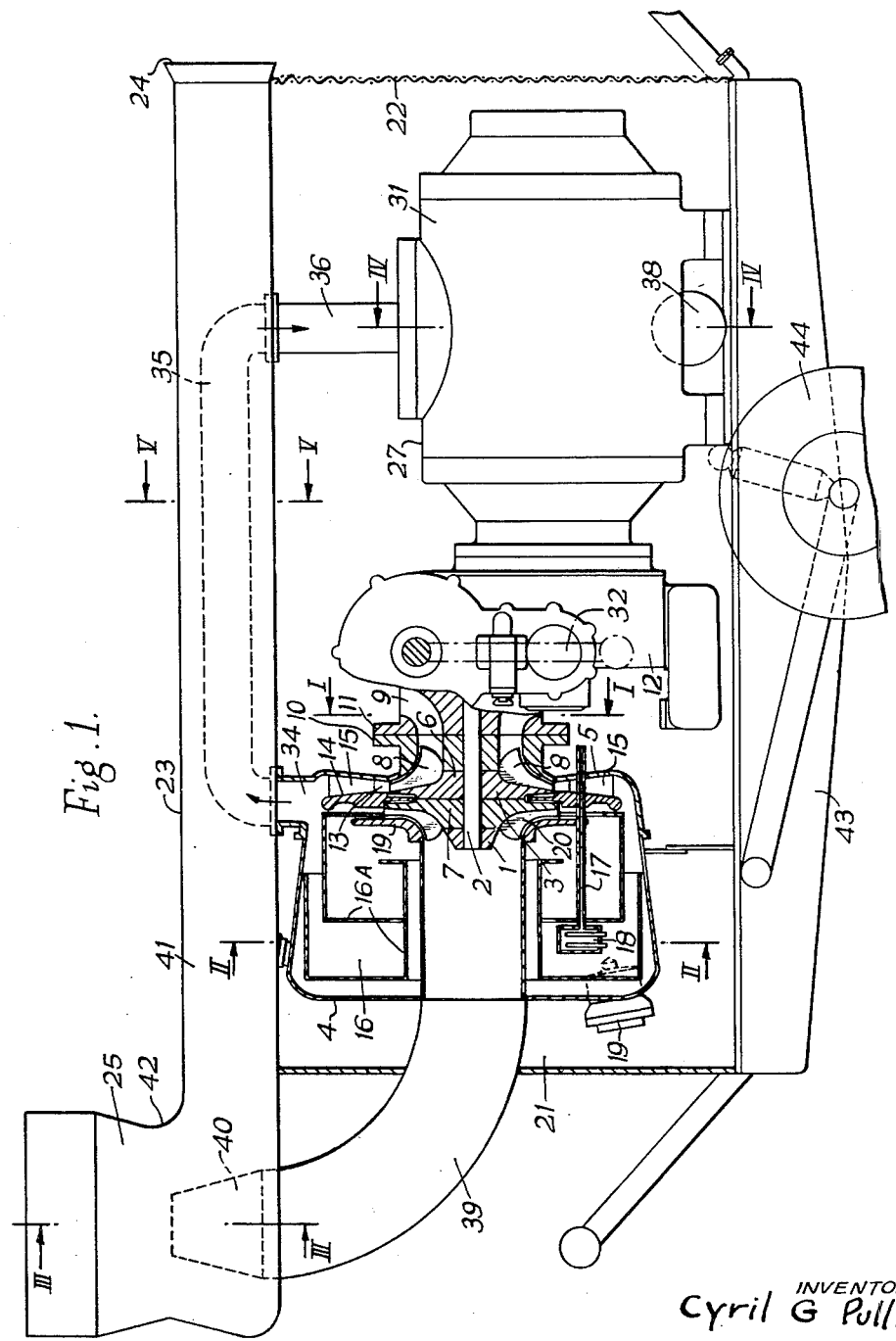

Oct. 2, 1962      C. G. PULLIN      3,056,539
GAS TURBINE COMPRESSOR UNITS

Filed Feb. 3, 1959      4 Sheets-Sheet 1

INVENTOR
Cyril G Pullin
BY Mason, Kolehmainen
Rathburn & Wyss
ATTORNEYS

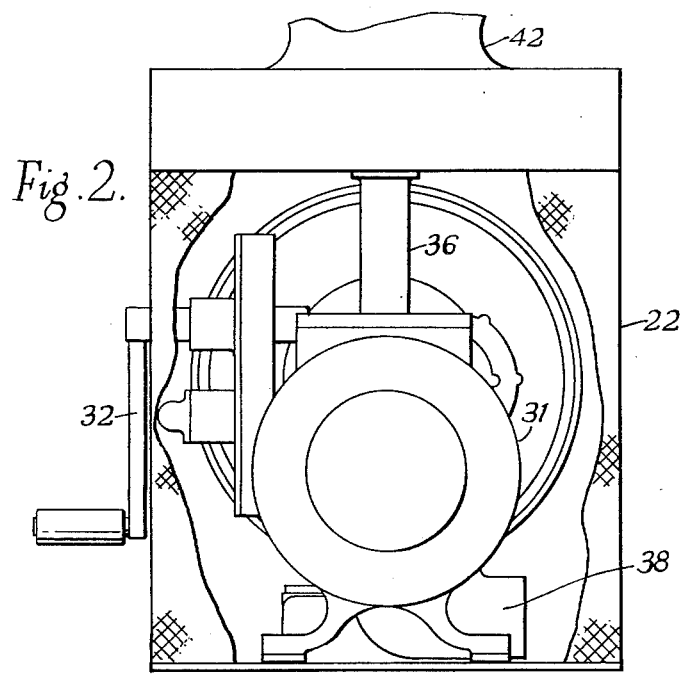
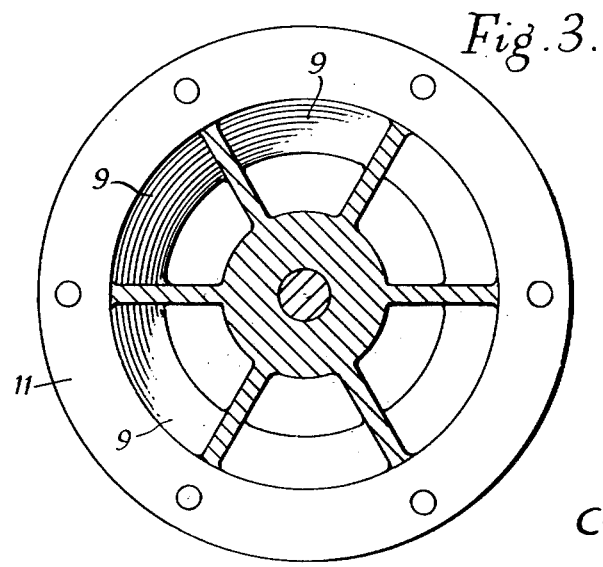

INVENTOR
Cyril G. Pullin
BY

ATTORNEYS

Oct. 2, 1962

C. G. PULLIN 3,056,539

GAS TURBINE COMPRESSOR UNITS

Filed Feb. 3, 1959

4 Sheets-Sheet 4

INVENTOR
Cyril G. Pullin
BY

ATTORNEYS 3,056,539
GAS TURBINE COMPRESSOR UNITS
Cyril George Pullin, Wickfield, Copperfield Crescent,
Kent, England
Filed Feb. 3, 1959, Ser. No. 790,926
Claims priority, application Great Britain Feb. 3, 1958
5 Claims. (Cl. 230—45)

The present invention relates to a plant for supplying high pressure gas and comprising a gas turbine-compressor unit, and particularly to such plants which are used for supplying compressed air for the operation of high pressure pneumatically-actuated tools or machines.

One object of the invention is to provide such a unit in which the compressor of the gas turbine which is of the high speed centrifugal type, is combined with a relatively low speed positive air displacement machine or booster unit for the purpose of boosting the air pressure generated by the centrifugal compressor of the gas turbine to a higher order than is generally accepted in centrifugal constructions particularly if of the single stage type.

It is well known that centrifugal or axial flow single stage compressors are limited as regards compression ratio, particularly in small sizes, 1.8 to 2 to 1 being considered as the practical limit. Increased ratios can be gained by staging i.e., 2, 3, 4, 5, and more stages as may be required.

The practical requirement of a compressor unit for certain industrial and outside operational requirements is a gauge pressure of 100 to 120 p.s.i. minimum. It has been proposed to tap-off the gas turbine compressor air for such purposes as road drills, concrete breakers and so on, but the simple, single stage machine is limited to some 27–30 p.s.i. For instance, a small 60 H.P. gas turbine rotating at some 35,000 r.p.m. can supply 120 c.f.m. at 27–30 p.s.i. but the residual shaft horse power available will then drop to 26–30 H.P. but available for use if desired. Although this meets the requirement as regards volume of air, the pressure is too low for the tools and equipment now on the market. Staging of the centrifugal compressor is of course possible but the design is somewhat complex and costly, particularly as intercoolers are essential for efficient operation and reasonable end temperature of the air.

According to the present invention, the plant comprises a gas turbine unit, itself comprising a centrifugal compressor and turbine in known manner, from which air is bled and passed through an intercooler into the inlet of a positive displacement machine or booster unit, the air being delivered to the place of use of the air. In this way, it is possible to raise the initial pressure of the air which is tapped from the compressor of the gas turbine unit from a relatively low pressure per square inch to a relatively high pressure in one stage, or by further stages according to pressure requirements, whereas the usual practice is to make use of an engine driven positive displacement machine generally operating on at least a two-stage principle with means of intercooling between the stages or by the injection of a fluid for cooling, or by the multi-staging of centrifugal compression with intercoolers as required.

According to a further feature of the invention, the high-velocity, high-mass flow of the exhaust gas from the turbine is utilised in the manner of an injector so as to induce the necessary flow of air over the intercooler components. For instance, this may be achieved by fitting the outlet end of the turbine exhaust pipe within a section of the intercooler and shaping the end of the exhaust pipe in the form of a nozzle, so that in combination with a suitably-shaped air outlet from the intercooler it will form a venturi which acts to induce the necessary flow of air over the intercooler components.

The shaft of the displacement machine or booster unit may be coupled to the shaft of the gas turbine unit by means of a reduction gear, and a clutch or other form of coupling, which may be manually or automatically-operated, may be arranged between the reduction gearing and the shaft of the displacement machine or booster unit.

In a plant which will be more fully described hereinafter, at an area where the kinetic energy of the air from the compressor of the gas turbine unit has been converted into pressure energy prior to its entering the combustion chamber of the turbine unit, the compressor casing is connected by means of an air bleed conduit to an outflow section of the intercooler which is also connected by a conduit to the inlet of the displacement machine or booster unit.

In the same construction, the gas turbine unit and the displacement machine or booster unit are enclosed in a casing into which feeding air from the gas turbine compressor is drawn through a filter at the opposite end of the casing from that at which the turbine unit is arranged and thus promotes cooling of the displacement machine or booster unit, the turbine compressor casing and components.

The displacement machine or booster unit may be of any known type including radial vane, piston, eccentric rotor, scroll, and so on suitable for high or low speed operation.

The turbine may be of the single or multiple stage inflow type or a single or multiple stage axial flow type, and the turbine compressor may be of the single or double entry radial flow type, in single or multi-stage configuration.

The invention has the advantage that it provides an air compressor of high output at high pressure but which may be of small overall dimensions and particularly of low total weight. The invention has the further advantage that only air is employed and oil or water cooling radiators or systems are not required for cooling the prime mover, the intercooler, or the displacement type compressor but may be adopted if desired.

Figure 4:
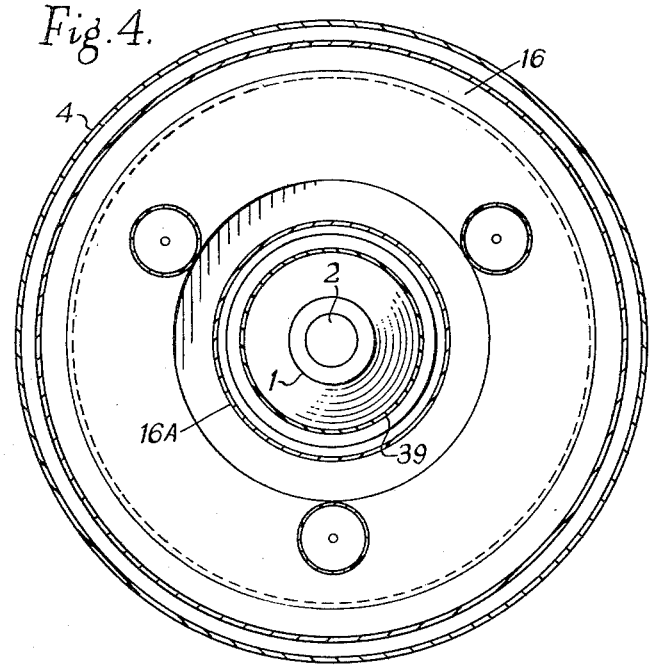
Figure 5:
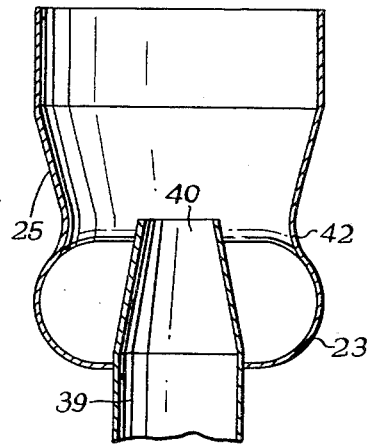
Figure 6:
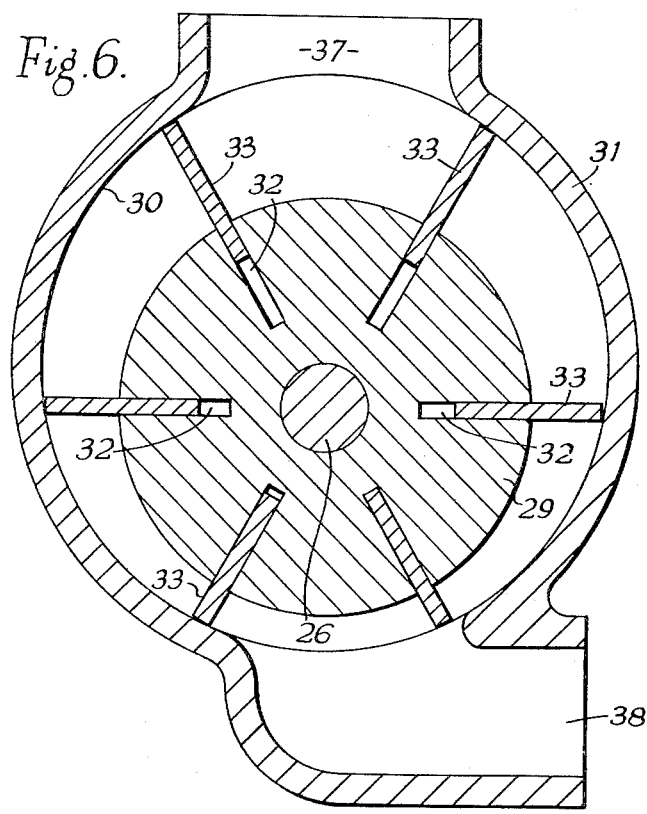
Figure 7:
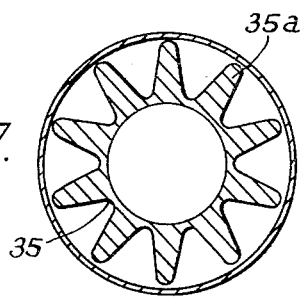

One constructional form of the invention is shown, by way of example, in the accompanying drawings, wherein:

FIGURE 1 is a side elevation partly in section of the plant;
FIGURE 2 is an end elevation of the plant;
FIGURE 3 is a section on the line I—I in FIGURE 1;
FIGURE 4 is a section, to a smaller scale, on the line II—II in FIGURE 1;
FIGURE 5 is a section, to a smaller scale, on the line III—III in FIGURE 1;
FIGURE 6 is a section on the line IV—IV in FIGURE 1; and
FIGURE 7 is a section on the line V—V in FIGURE 1.

Referring to the drawings:
This constructional form of the invention comprises a single stage, inflow-type turbine 1 which, however, could be replaced by a multiple-stage inflow-type turbine or by a single or multiple-stage flow horizontal or axial flow type. In known manner, the turbine may be mounted on the same shaft 2 as a single entry radial flow single-stage compressor 3, the unit being mounted within a sheet metal casing 4 closed at one end by a flanged cover 5. The compressor disc 6 and the turbine disc 7 are arranged back-to-back and air is fed to the space between the compressor vanes 8 through air inlets 9, FIGS. 1 and 3, formed in the flanged end 10 of the flanged cover 5 and the flange 11 of a reduction gear box 12. The rotation of the compressor disc causes air to be sucked from the inlets 9 into the spaces between the compressor vanes 8 from which it is discharged outwardly at high pressure into an annular discharge space 13 formed between an annular partition 14 carried by radial exit vanes 15 which are integral with the partition and with the cover 5. After leaving the spaces between the exit vanes 15, the compressed air passes partly into an annular combustion chamber 16 (see also FIG. 4) which is supported by internal baffles 16A and into which pressurised fuel, fed by fuel pipes 17, is continuously injected in known manner through one or more fuel nozzle devices 18, the fuel being ignited by an igniter 19 and burnt in the combustion chamber. Some of the air-diluted burning mixture flows between the partition 14 and an anular guide ring 19 into the spaces between the turbine blades 20 and thus causes the turbine disc 7, the blades 20 and the turbine-compressor shaft 2 to rotate at high speed.

The gas turbine unit is mounted within an external sheet metal casing 21 into which feeding air for its compressor is drawn through a filter 22 at the opposite end of the casing from that at which the turbine unit is arranged. An intercooler unit 23 is arranged on top of the external casing 21 with its inlet 24 disposed above the filter 22, the intercooler having a partly-flared, and partly-cylindrical, upwardly-directed outlet 25, see FIGS. 1 and 5, disposed beyond the end of the external casing 21 adjacent to which the turbine unit is situated. Through reduction gearing of known type, enclosed in the said reduction gear box 12, the shaft 2 of the turbine unit is geared to the shaft 26, FIG. 6 of a positive air displacement unit or booster 27, consisting of a radial vane type displacement type compressor which may be of any convenient construction. The eccentric rotor vane construction shown in FIG. 6 is preferred however.

In this known construction the shaft 26 on which the rotor 29 is keyed is eccentric to the axis of the machined bore 30 of the casing 31 of the displacement unit or booster and the rotor is formed with a number of radial slots 32 in which blades 33 are slidable.

The reduction gearing may comprise a manually-operable or automatically operated clutch or other form of coupling (not shown) as a free-wheel or over-riding device and a starter (also not shown) operated by a starter crank handle 32.

At an area where the kinetic energy of the air from the gas turbine compressor has been converted into pressure energy prior to its entering the combustion chamber 16, the turbine compressor casing is connected by an air bleed conduit 34 to an outflow section 35 of the intercooler, which section is also connected by a conduit 36 to the inlet 37 of the displacement type compressor. The object of the intercooler is to dissipate some of the heat of compressor which has taken place in the turbine-compressor so that the air supplied to the displacement unit or booster is at a sufficiently low temperature for efficient re-compression and to ensure that the temperature of the air discharged from the displacement unit or booster is acceptable. As shown in FIGURE 7, the outflow section 35 is provided with fins or grills 35A for increased heat transfer to the induced air flow. The casing of the displacement unit or booster is cooled by fins (not shown) for cooling by the air which passes through the filter 22 and the external casing 21 to the compressor 3 of the turbine unit. The air compressed by the displacement unit or booster due to the rotation of the rotor 29 and the movement of the blades 33 is discharged from the displacement unit or booster through the outlet 38 which is connected to the place of use of the air.

In order to utilise the high velocity, high mass flow of the exhaust gas from the turbine 1 exhaust gas is caused to flow through an upwardly-curved exhaust pipe 39, the upper end 40 of which is arranged within the inflow section 41 of the intercooler and is convergently tapered to form a nozzle so that in cooperation with the throat 42 of the said upwardly-flared upwardly-directed outlet 25 from the intercooler, it provides a venturi which will act to induce the necessary flow of air over the outflow section 35 of the intercooler.

I claim:
1. Apparatus for producing and supplying air under high pressure comprising a gas turbine having a high velocity high mass flow of exhaust gas therefrom, a first compressor, means drivingly interconnecting said turbine and said first compressor, a second compressor of the positive displacement type, reduction gear means for driving said second compresor from said turbine, means for supplying at least a portion of the air compressed by said first compressor to the inlet of said second compressor, an intercooler in said last-mentioned means for cooling the compressed air between said compressors and means for utilizing the high velocity high mass flow of said exhaust gas from said turbine so as to induce a flow of cooling air through said intercooler to cool the compressed air between said compressors.

2. Apparatus for supplying high pressure air as set forth in claim 1 wherein said last-mentioned means includes a venturi connected to induce said flow of cooling air through said intercooler, and a nozzle in the throat of said venturi connected to receive said exhaust gas from said turbine.

3. Apparatus for supplying high pressure air as set forth in claim 2 wherein said flow of cooling air through the intercooler is expelled from said apparatus through said venturi at a point sufficiently remote from the inlet of said first compressor so as to minimize introduction of said expelled air into said first compressor.

4. Apparatus for producing and supplying high pressure air including a gas turbine having a high velocity high mass flow of exhaust gas therefrom, a first compressor driven by said turbine having an air outlet for discharging compressed air, an intercooler connected to said air outlet to receive at least a portion of said compressed air and having an air outlet, a second compressor of the positive displacement type having its air inlet connected to the last-mentioned outlet and having an outlet for high pressure air and operative to increase the pressure of the air passing through it, means drivingly connecting said second compressor so as to be driven by said turbine, and means for utilizing the high velocity high mass flow of said exhaust gas from said turbine so as to induce a flow of cooling air through the intercooler over the intercooler components to cool the compressed air passing through said intercooler.

5. Apparatus for supplying high pressure air as set forth in claim 4 wherein said last-mentioned means includes a venturi connected to induce said flow of cooling air through said intercooler, and a nozzle in the throat of said venturi connected to receive said exhaust gas from said turbine.

References Cited in the file of this patent

UNITED STATES PATENTS

| | | |
|---|---|---|
| 917,232 | Worthington | Apr. 6, 1909 |
| 1,025,251 | Desmond | May 7, 1912 |
| 1,187,031 | Black | June 13, 1916 |
| 1,282,590 | Kernohan | Oct. 22, 1918 |
| 2,365,551 | Hermitte | Dec. 19, 1944 |
| 2,366,365 | Sorensen | Jan. 2, 1945 |
| 2,439,273 | Silvester | Apr. 6, 1948 |
| 2,491,482 | Dolza | Dec. 20, 1949 |
| 2,612,310 | Eggmann | Sept. 30, 1952 |
| 2,746,531 | Brelsford | May 22, 1956 |
| 2,864,235 | Paris | Dec. 16, 1958 |
| 2,918,787 | Schelp | Dec. 29, 1959 |
| 2,925,954 | Spillman | Feb. 23, 1960 |

FOREIGN PATENTS

| | | |
|---|---|---|
| 917,569 | France | Sept. 16, 1946 |
| 1,138,583 | France | Jan. 28, 1957 |